UNITED STATES PATENT OFFICE.

JAMES P. HERRON, OF WASHINGTON, DISTRICT OF COLUMBIA.

IMPROVEMENT IN PROCESSES OF MAKING PAPER-PULP FROM PALM.

Specification forming part of Letters Patent No. 151,662, dated June 2, 1874; reissue No. 6,646, dated September 14, 1875; application filed March 27, 1875.

*To all whom it may concern:*

Be it known that I, JAMES P. HERRON, of the city of Washington, District of Columbia, have made certain valuable discoveries and new and useful Improvements in the Manufacture and Articles of Paper-Stock and Paper; and I do hereby declare the following to be a full, clear, and exact description of such discovery and invention, such as will enable others skilled in the art to which they pertain to make use of the same.

I regard myself as the first to discover that palm, and especially those varieties of it known as *Chamarops serulata* and *Hystrix*, *Sable Adansonii* or *pumilla*, and *Corypha palmetto*, all of which are found in the southern portions of the United States, contain within themselves all the properties necessary to make a good whole-stock paper material and paper, if properly treated, so that such properties shall not be wasted or destroyed in the reduction or manufacture, and also as the first to successfully reduce such palm to such paper-making material as to make it into stock and paper.

My invention relates to such discovery; and consists, first, in the application of said varieties of palm to the manufacture of paper-stock and paper; and, secondly, in a process for reducing said palm to paper-stock and paper-pulp.

I am aware that suggestions have been made that the fiber of palm, which is strong and tenacious, might be used for making mats, cordage, paper-pulp, &c., after being separated from the other parts, and that a patent was issued to one J. W. Dixon, May 1, 1866, for a process by which he proposed to disintegrate and separate such fibers, which, he says, may afterward be used for spinning or making into paper.

My experiments and investigations have, however, compelled me to regard the proposed process of Dixon as inadequate and impracticable for any purpose of reducing to paper-stock the varieties of palm above set forth, and I wholly disclaim it as constituting no part of my invention. In fact, the process of Dixon could not be employed in carrying out my conception, and rendering it available for practical purposes, since I do not propose to separate the fiber from, but to use it in connection with, other constituent parts of the palm, which other constituent parts are so indispensable that if they were removed, as is proposed by Dixon's process, they would have to be restored, or their equivalents supplied, in order to make paper-stock and paper from the fiber.

The following is a description of my process for reducing said palm to paper material: The material is first prepared by tearing up, cutting, or breaking into convenient size to be easily manipulated, and is admitted into a boiler or suitable vessel for digesting. It is then put into the digester, which is a close vessel capable of withstanding considerable pressure. I admit into this digester a solution of caustic alkali, not of sufficient strength to act as a solvent in destroying or eating out the resinous and albuminous substances that unite the fibers, together with the talco-silicious properties, but simply of sufficient strength to render the mass slippery for easy agitation. A jet of steam is admitted into the digester and maintained until a considerable pressure is obtained. A very high degree of pressure is not essential. When pressure is used it is principally for mechanical purposes—for example, to aid in conducting or propelling the stock through the machine. When the mass has become well softened by cooking with agitation, the products of the digester are expelled into a grinding-machine, which is steam-tight, and the mass is ground while under the direct action of steam, which is injected into the mass, commingling with it in passing through the mill or grinding-machine, so that as the parts are separated by grinding the steam will act to assist in a speedy steeping of the freshly-exposed portions, and will thus reduce or set free the coloring matter. After passing through the grinder the mass will be found to possess rough, branchy fibers, with gluey, resinous, talcky-silicious properties, in a pulpy consistency, naturally combined for good strong paper, and the product can be employed at once as a whole stock for the manufacture of a coarse grade of paper, or can be advantageously employed as a part stock in mixing with other fibrous pulps in the manufacture of different grades of paper. For finer grades of paper-stock I do not stop the process at the end of the first grinding operation, but discharge the mass, as ground again, into a digester like the first, where it is again thoroughly agitated as before, and is passed thence into and through another grinder, and subjected to commingling with the steam in passing through, as before, producing a very much finer stock, which can be still further improved by one or more succeeding repetitions of the foreging operations.

The pulpy products that are obtained after the second and following grinding can each of them be employed as a whole stock and made into fine grades of paper.

The stock prepared by this process from the material named possesses excellent felting properties, as can be seen by the eye, and under the microscope is variegated, of unusually fine long fibers, irregular, serrated, pointed, and branchy, having silicious-ivory or pearly-talcous appearance, and is to the natural eye entirely distinctive from other pulps, and the papers that are made therefrom possess the same distinguishable characteristics, equal in texture to the finest India paper, and having the smooth wearing character of parchment, my process retaining the natural properties of the palm, which are of a fine, smooth, glossy, and even texture, ordinarily given by artificial sizing, &c., to papers. At the same time, the strength of the fiber having been in no degree injured by the alkali, the paper therefrom produced is of a very fine, tough, strong, and durable character.

Instead of employing alkali in solution in the first operation—which, it will be remembered, was such a weak solution as not to act upon and destroy the resinous and glutinous substances that bind the fibers together, or any of the other natural paper-making properties—different ingredients may be employed for like purpose, such as naphtha, benzine, soap, &c.

The digester, into which the material is first placed, should be of such a character as possesses the means of thoroughly agitating the entire mass while it is subjected to the heat and pressure, and similar agitation of the mass should take place in each succeeding digester that may be employed. In the grinding-engine a strong current of steam should be made to pass through and intermingle with the mass in grinding, to act on the freshly-separated fibers, greatly assisting disintegration, and also reducing the coloring matter.

After the grinding is accomplished the mass is thoroughly washed from soluble foreign matter, preserving the substantial paper-making properties, and the pulp may be bleached to the most perfect whiteness without injuring materially the very fine desirable paper-composing ingredients (in natural proportion peculiar to the aforesaid varieties of palm) by the ordinary bleaching-process.

The beating process I do not claim; but I do believe myself to be the first to make a whole-stock pulp or paper-making material and paper, having the properties described, from the varieties of palm named, spontaneously growing in inexhaustible quantities in southern portions of the United States.

The machinery that I prefer to employ in my process forms a subject-matter of a separate application for Letters Patent filed by me March 26, 1874, in the Patent Office of the United States.

I do not limit myself in the manufacture of the pulp or paper stock, above described, from such palm to said process or machinery; but I claim—

1. Paper and paper-stock made partly or wholly from palm, and possessing the peculiar fiber, and the glossy or talcky-silicious ivory appearance and distinguishable properties, substantially as described.

2. The within-described process of making paper material from varieties of palm, wherein the substance is cut or torn into pieces of suitable size, then cooked in a close digester with thorough agitation and under steam-pressure, in a weak solution of alkali, naphtha, benzine, or soap, as set forth; then completely ground while steam passes freely through the grinder and intermingles with the material in grinding, reducing and bleaching it, the material being finally washed, all substantially as set forth and described.

In testimony that I claim the foregoing I have hereunto set my hand this 23d day of March, 1875.

JAMES P. HERRON.

Witnesses:
M. CHURCH,
E. S. KARNER.